US012367799B2

(12) United States Patent
Lian et al.

(10) Patent No.: US 12,367,799 B2
(45) Date of Patent: Jul. 22, 2025

(54) DRIVER CIRCUIT AND METHOD FOR COMPENSATING PIXEL VALUES OF DISPLAY PIXELS

(71) Applicant: Novatek Microelectronics Corp., Hsinchu (TW)

(72) Inventors: Zi-Yi Lian, Miaoli County (TW); Yen-Tao Liao, Hsinchu (TW)

(73) Assignee: Novatek Microelectronics Corp., Hsinchu (TW)

(*) Notice: Subject to any disclaimer, the term of this patent is extended or adjusted under 35 U.S.C. 154(b) by 106 days.

(21) Appl. No.: 18/509,264

(22) Filed: Nov. 14, 2023

(65) Prior Publication Data

US 2025/0157380 A1 May 15, 2025

(51) Int. Cl.
*G09G 3/20* (2006.01)
*G09G 3/3208* (2016.01)

(52) U.S. Cl.
CPC ......... *G09G 3/2007* (2013.01); *G09G 3/3208* (2013.01); *G09G 2320/0233* (2013.01); *G09G 2320/0626* (2013.01); *G09G 2360/16* (2013.01)

(58) Field of Classification Search
CPC ............... G09G 3/2007; G09G 3/3208; G09G 2320/0233; G09G 2320/0626; G09G 2360/16
See application file for complete search history.

(56) References Cited

U.S. PATENT DOCUMENTS

| | | | | |
|---|---|---|---|---|
| 12,142,190 | B1 * | 11/2024 | Lin | G09G 3/32 |
| 12,142,233 | B1 * | 11/2024 | Furihata | G09G 3/36 |
| 2019/0066574 | A1 * | 2/2019 | Wang | G09G 3/20 |
| 2020/0175930 | A1 * | 6/2020 | Koo | G09G 3/3614 |
| 2023/0102440 | A1 * | 3/2023 | Aogaki | G09G 5/10 345/690 |
| 2023/0164426 | A1 * | 5/2023 | Xu | H04N 23/63 348/222.1 |
| 2024/0321227 | A1 * | 9/2024 | Tang | G09G 3/3607 |
| 2024/0355256 | A1 * | 10/2024 | Xu | G09G 3/20 |
| 2024/0357881 | A1 * | 10/2024 | Xie | H10D 86/00 |
| 2024/0371321 | A1 * | 11/2024 | Zhang | G09G 3/3233 |

* cited by examiner

*Primary Examiner* — Sejoon Ahn
(74) *Attorney, Agent, or Firm* — JCIPRNET

(57) ABSTRACT

A driver circuit including a controller circuit is provided. The controller circuit is configured to perform an image compensating operation on a display pixel of an image sensing region of a display panel to compensate a pixel value of the display pixel using a first compensating value. The image sensing region is a circular area comprising image sensors. The controller circuit determines the first compensating value according to a location of the display pixel in the image sensing region. A method for compensating pixel values of display pixels is also provided.

16 Claims, 6 Drawing Sheets d=0~D1

G8_1

| n | dn*bk | Wd |
|---|---|---|
| 0 | 0 | 0.01 |
| 1 | 1 | 0.02 |
| 2 | 2 | 0.03 |
| 3 | 3 | 0.04 |
| . | . | . |
| . | . | . |

G16_1

| Wd |
|---|
| 01 |
| 02 |
| 03 |
| 04 |

G32_1

| Wd |
|---|
| 01 |
| 02 |
| 03 |
| 04 |

d=D1~D2

G8_2 G16_2 G32_2

| n | dn*bk-D1 | Wd |
|---|---|---|
| 0 | 0 | 0.005 |
| 1 | 2 | 0.01 |
| 2 | 4 | 0.015 |
| 3 | 8 | 0.025 |
| . | . | . |
| . | . | . |

d=D2~D3

G8_3 G16_3 G32_3

| n | dn*bk-D2 | Wd |
|---|---|---|
| 0 | 0 | 0.0025 |
| 1 | 4 | 0.005 |
| 2 | 8 | 0.0875 |
| 3 | 16 | 0.0125 |
| . | . | . |
| . | . | . |

FIG. 7

DRIVER CIRCUIT AND METHOD FOR COMPENSATING PIXEL VALUES OF DISPLAY PIXELS

BACKGROUND

Technical Field

The invention relates to an electronic circuit and a method for compensating data, more specifically, to a driver circuit and a method for compensating pixel values of display pixels.

Description of Related Art

OLED (Organic Light-Emitting Diode) panels are suitable for the development of under-display cameras because it is self-luminous. Camera under display (CUD) products are gradually being added to the OLED panels. However, there are still some issues to be addressed, mainly the challenge of improving the transmittance of the CUD region. One solution to address this issue could be to decrease the size or the number of light emitting pixels, thereby allowing the driving circuit to handle more light emitting pixels. However, this approach has the drawback of increasing the visibility of the normal region border and decreasing the resolution, which may become more noticeable. In addition, the greater change in brightness results in demura being more difficult.

SUMMARY

The invention is directed to a driver circuit and a method for compensating pixel values of display pixels, capable of improve uneven brightness of an image sensing region, e.g. the CUD region, of a display panel.

An embodiment of the invention provides a driver circuit including a controller circuit. The controller circuit is configured to perform an image compensating operation on a display pixel of an image sensing region of a display panel to compensate a pixel value of the display pixel using a first compensating value. The image sensing region is a circular area comprising image sensors. The controller circuit determines the first compensating value according to a location of the display pixel in the image sensing region.

In an embodiment of the invention, the controller circuit determines a weight value according to the location of the display pixel in the image sensing region. The first compensating value is obtained by modifying a second compensating value according to the weight value.

In an embodiment of the invention, the controller circuit is further configured to perform the image compensating operation on a display pixel of a non-image sensing region of the display panel to compensate the pixel value of the display pixel using the second compensating value.

In an embodiment of the invention, a plurality of lookup tables are set up for the image sensing region, and the lookup tables record relationships between the weight values and the locations of the display pixels.

In an embodiment of the invention, the controller circuit determines the weight value according to the lookup tables.

In an embodiment of the invention, for a specified pixel value, the different lookup tables are set up for different regions of the image sensing region.

In an embodiment of the invention, for a specified region of the image sensing region, the different lookup tables are set up for different pixel values of the display pixels.

In an embodiment of the invention, different regions of the image sensing region have different block sizes, and the block size indicates how many display pixels share the same weight value.

In an embodiment of the invention, the lookup tables are set up for a specified pixel value by capturing a gray level variation and a brightness variation of the image sensing region.

In an embodiment of the invention, the driver circuit further includes a storage circuit. The storage circuit is coupled to the controller circuit, and configured to store the lookup tables.

In an embodiment of the invention, the image sensing region comprises a first region, a second region and a third region. The first region is a circular area. The second region is a ring area surrounding the first region, and the third region is a ring area surrounding the second region.

In an embodiment of the invention, the first region includes the image sensors and the display pixels. The second region includes driving circuits and the display pixels, and the third region includes the display pixels.

An embodiment of the invention provides a method for compensating pixel values of display pixels. The method includes: receiving pixel data, and determining a location of a display pixel that the pixel data is to be written; when the location of the display pixel is determined in an image sensing region of a display panel, determining a first compensating value according to the location of the display pixel in the image sensing region, wherein the image sensing region is a circular area comprising image sensors; and performing an image compensating operation on the display pixel of the image sensing region to compensate the pixel value of the display pixel using the first compensating value.

In an embodiment of the invention, a step of determining the first compensating value according to the location of the display pixel in the image sensing region includes: determining a weight value according to the location of the display pixel in the image sensing region; and modifying a second compensating value according to the weight value to obtain the first compensating value.

In an embodiment of the invention, the method for compensating the pixel values of the display pixels further includes: when the location of the display pixel is determined in a non-image sensing region of the display panel, performing the image compensating operation on the display pixel of the non-image sensing region to compensate the pixel value of the display pixel using the second compensating value.

In an embodiment of the invention, the method for compensating the pixel values of the display pixels further includes: setting up a plurality of lookup tables for the image sensing region by capturing a gray level variation and a brightness variation of the image sensing region, wherein the lookup tables record relationships between the weight values and the locations of the display pixels.

In an embodiment of the invention, the step of determining the first compensating value according to the location of the display pixel in the image sensing region further includes: determining the weight value according to the lookup tables.

In an embodiment of the invention, a step of setting up the plurality of lookup tables for the image sensing region includes: for a specified pixel value, setting up the different lookup tables for different regions of the image sensing region.

In an embodiment of the invention, a step of setting up the plurality of lookup tables for the image sensing region includes: for a specified region of the image sensing region, setting up the different lookup tables for different pixel values of the display pixels.

In an embodiment of the invention, different regions of the image sensing region have different block sizes, and the block size indicates how many display pixels share the same weight value.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 7 illustrates lookup tables of different pixel values according to an embodiment of the invention.

DESCRIPTION OF THE EMBODIMENTS

Embodiments are provided below to describe the disclosure in detail, though the disclosure is not limited to the provided embodiments, and the provided embodiments can be suitably combined. The term “coupling/coupled” or “connecting/connected” used in this specification (including claims) of the application may refer to any direct or indirect connection means. For example, “a first device is coupled to a second device” should be interpreted as “the first device is directly connected to the second device” or “the first device is indirectly connected to the second device through other devices or connection means.” In addition, the term “signal” can refer to a current, a voltage, a charge, a temperature, data, electromagnetic wave or any one or multiple signals.

Figure 1:
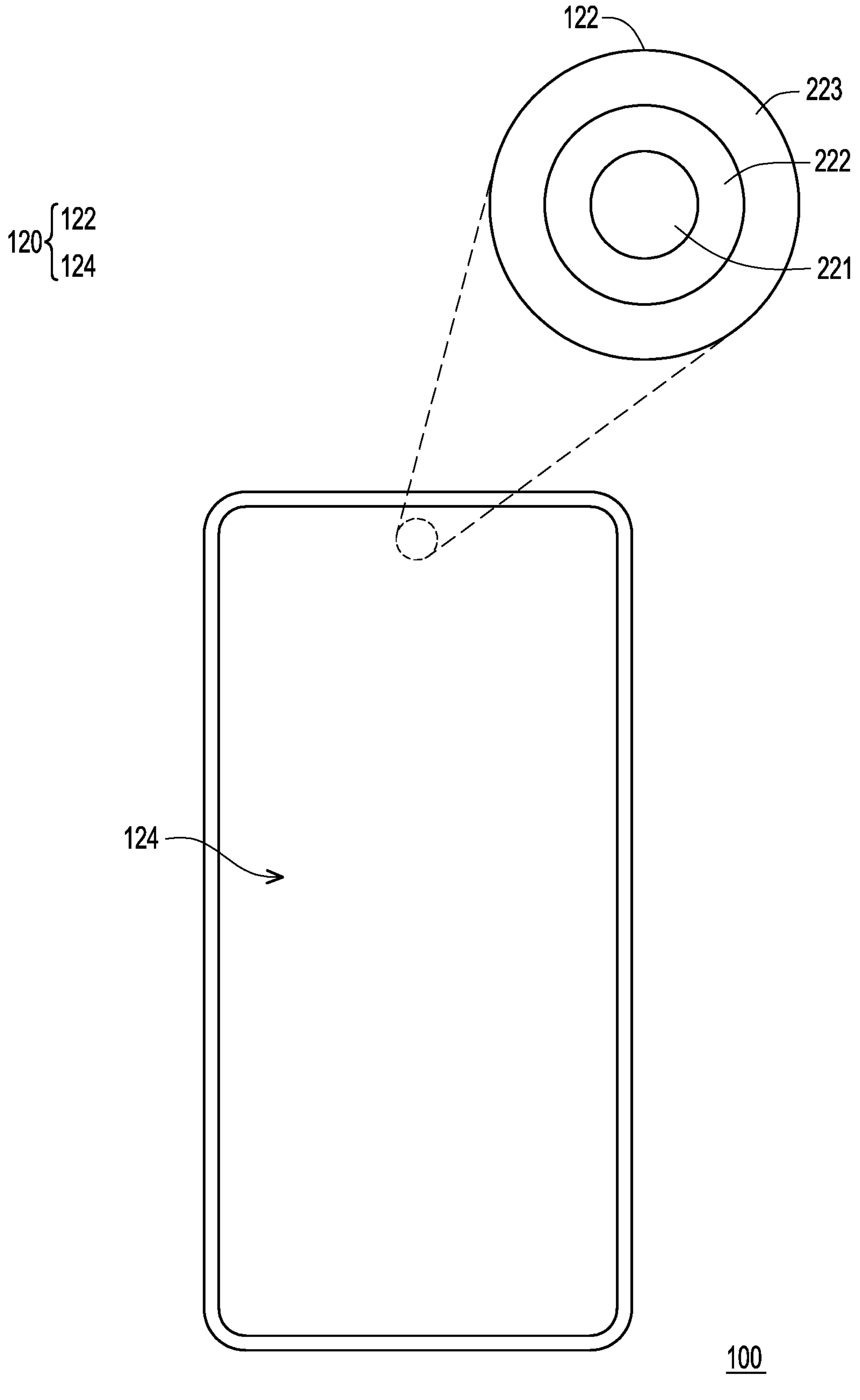
FIG. 1 is a schematic diagram illustrating an electronic device according to an embodiment of the invention.
Figure 2:
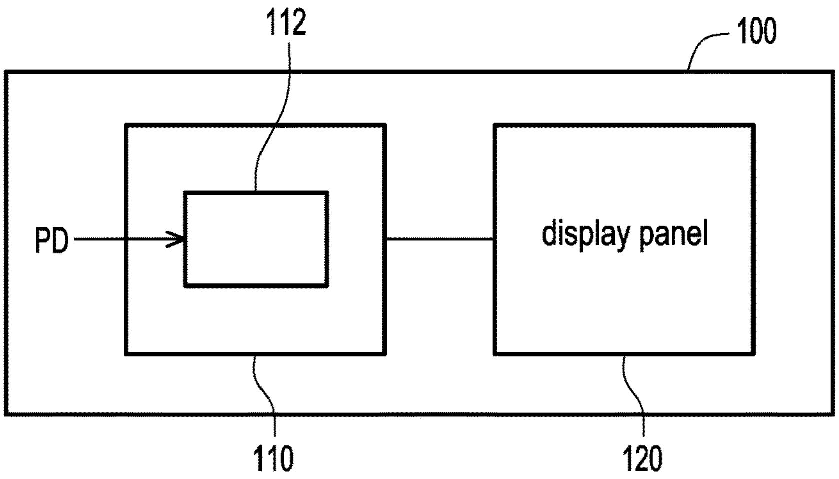
FIG. 2 is a block diagram illustrating the electronic device of FIG. 1 according to an embodiment of the invention.

FIG. 1 is a schematic diagram illustrating an electronic device according to an embodiment of the invention. FIG. 2 is a block diagram illustrating the electronic device of FIG. 1 according to an embodiment of the invention. Referring to FIG. 1 and FIG. 2, the electronic device 100 includes a driver circuit 110 and a display panel 120. The driver circuit 110 is configurable to be coupled to the display panel 120. The display panel 120 may be an OLED panel, which is not limited thereto.

The driver circuit 110 includes a controller circuit 112. The controller circuit 112 is adapted to perform an image compensating operation, e.g. a demura operation, on the display panel 120, such that the display panel 120 can display good image quality. For example, the controller circuit 112 receives pixel data PD, and compensates the data PD using a first compensating value CV1 or a second compensating value CV2 according to a location of a display pixel that the pixel data PD is to be written.

The display panel 120 includes an image sensing region 122 and a non-image sensing region 124. The image sensing region 122 is a circular area including image sensors for sensing images. The image sensors may be cameras under display (CUD). The image sensing region 122 also includes display pixels to display images. The image sensing region 122 is a transparent region with low reflection and high light transmission. In an embodiment, the image sensing region 122 displays images normally when no photo is taken, and turns into a transparent glass when a photo is taken.

The image sensing region 122 includes a first region 221, a second region 222 and a third region 223. The first region 221 is a circular area, and includes image sensors and display pixels. The second region 222 is a ring area surrounding the first region 221. The second region 222 includes driving circuits and display pixels. The driving circuits may be circuits for driving image sensors. The third region 223 is another ring area surrounding the second region 222. The third region 223 includes display pixels. In the present embodiment, the first region 221, the second region 222 and the third region 223 are concentric circles/rings.

For clarity and conciseness, structures of the image sensors, the display pixels and the driving circuits are not depicted in FIG. 1, and implementation illustration for the structures of the image sensors, the display pixels and the driving circuits can be obtained, taught and suggested with reference to common knowledge in the related art.

The non-image sensing region 124 is an area including display pixels, touch sensors and/or fingerprint sensors to perform a display function, a touch sensing function and/or a fingerprint sensing function, respectively. The driver circuit 110 is also adapted to drive the display panel 120 to perform the display function, the touch sensing function and/or the fingerprint sensing function.

Regarding hardware structures of the components in the embodiment of FIG. 2, the controller circuit 112 may be a processor having computational capability. Alternatively, the controller circuit 112 may be designed through hardware description languages (HDL) or any other design methods for digital circuits familiar to people skilled in the art and may be hardware circuits implemented through a field programmable gate array (FPGA), a complex programmable logic device (CPLD), or an application-specific integrated circuit (ASIC). In addition, enough teaching, suggestion, and implementation illustration for hardware structures of the controller circuit 112 can be obtained with reference to common knowledge in the related art.

In the present embodiment, the controller circuit 112 is configured to perform the image compensating operation on the display panel 120. The image compensating operation may be the demura operation. The demura operation is a technology that eliminates display mura and balances the brightness or the gray level of the image. For example, the controller circuit 112 receives the pixel data PD, and determines a location of a display pixel that the pixel data PD is to be written. When the location of the display pixel is determined in the non-image sensing region 124, the controller circuit 112 performs the image compensating operation on the display pixel of the non-image sensing region 124 of the display panel 120 to compensate the pixel value of the display pixel using a second compensating value CV2. The second compensating value CV2 may be obtained with reference to suitable demura methods known in the related art.

When the location of the display pixel is determined in the image sensing region 122, the controller circuit 112 performs the image compensating operation on the display pixel of the image sensing region 122 of the display panel 120 to compensate the pixel value of the display pixel using a first compensating value CV1. The first compensating value CV1 may be obtained by modifying the second compensating value CV2 according to a weight value Wd, which may be formulated as:

$$CV1=(1+Wd)\times CV2+bn \quad (1)$$

where CV1 is the first compensating value, CV2 is the second compensating value for the image sensing region 122 before modification, Wd is the weight value, and bn is a preset fine tuning parameter. The subscript n of the fine tuning parameter bn is equal to 1, 2 or 3 for the first region 221, the second region 222 and the third region 223, respectively.

Figure 3:
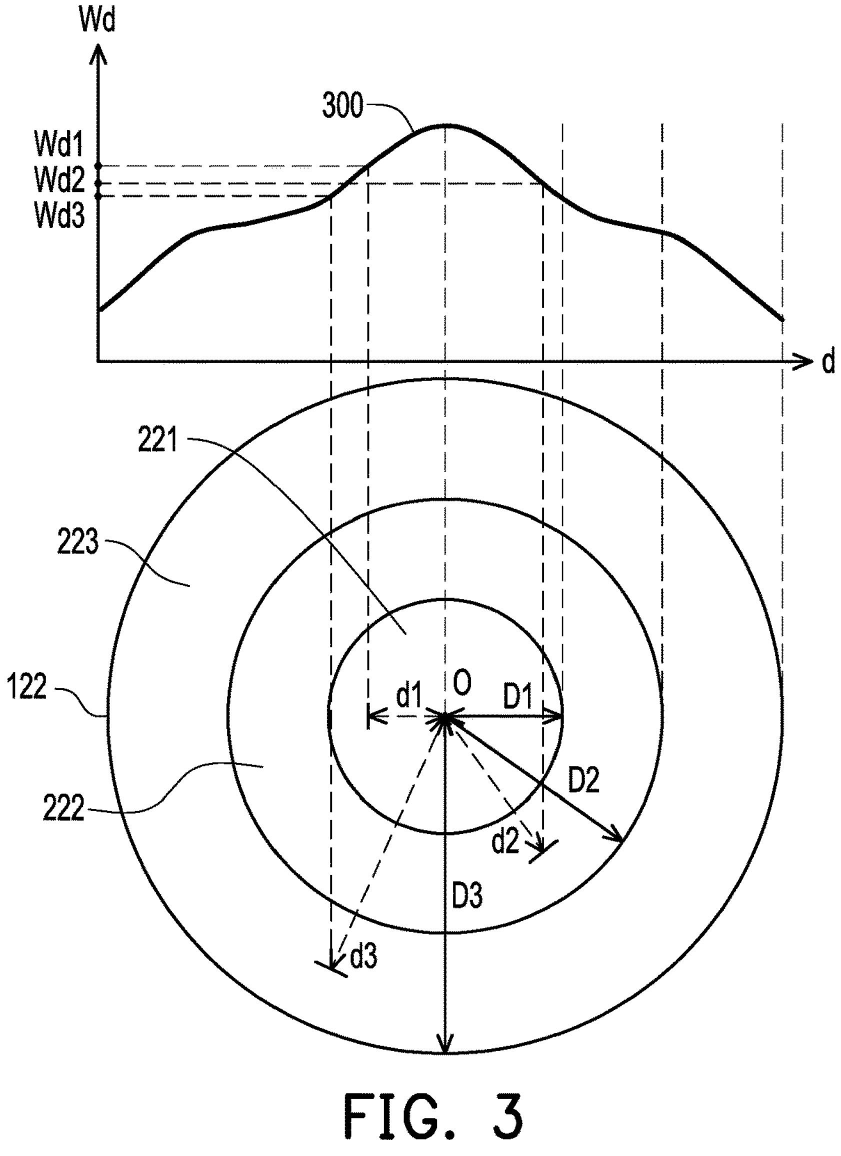
FIG. 3 illustrates a lookup table of a specified pixel value according to an embodiment of the invention.

In the present embodiment, the controller circuit 112 may determine the weight value Wd according to the location of the display pixel in the image sensing region 122, as illustrated in FIG. 3. Subsequently, the controller circuit 112 calculates the first compensating value CV1 using formula (1). Therefore, the controller circuit 112 determines the first compensating value CV1 according to the location of the display pixel in the image sensing region 122.

FIG. 3 illustrates a lookup table of a specified pixel value according to an embodiment of the invention. Referring to FIG. 3, the lookup table 300 of the specified pixel value is configured to determine weight values of display pixels, and presented in a curve formation. The lookup table 300 of the specified pixel value may be set up for the image sensing region 122 in advance. The lookup table 300 records relationships between the weight values and the locations of the display pixels. The pixel value of the display pixel may be gray level or brightness value.

The controller circuit 112 calculates the distance d between the display pixel and the center of circle O, and determines the weight value Wd of the display pixel according to the distance d and the lookup table 300. For example, when the distance d=d1 and $0<d1\leq D1$, the controller circuit 112 determines the weight value Wd as Wd1. When the distance d=d2 and $D1<d2\leq D2$, the controller circuit 112 determines the weight value Wd as Wd2. When the distance d=d3 and $D2<d2\leq D3$, the controller circuit 112 determines the weight value Wd as Wd3. In FIGS. 3, D1, D2 and D3 are radiuses of the first region 221, the second region 222 and the third region 223, respectively.

Figure 4:
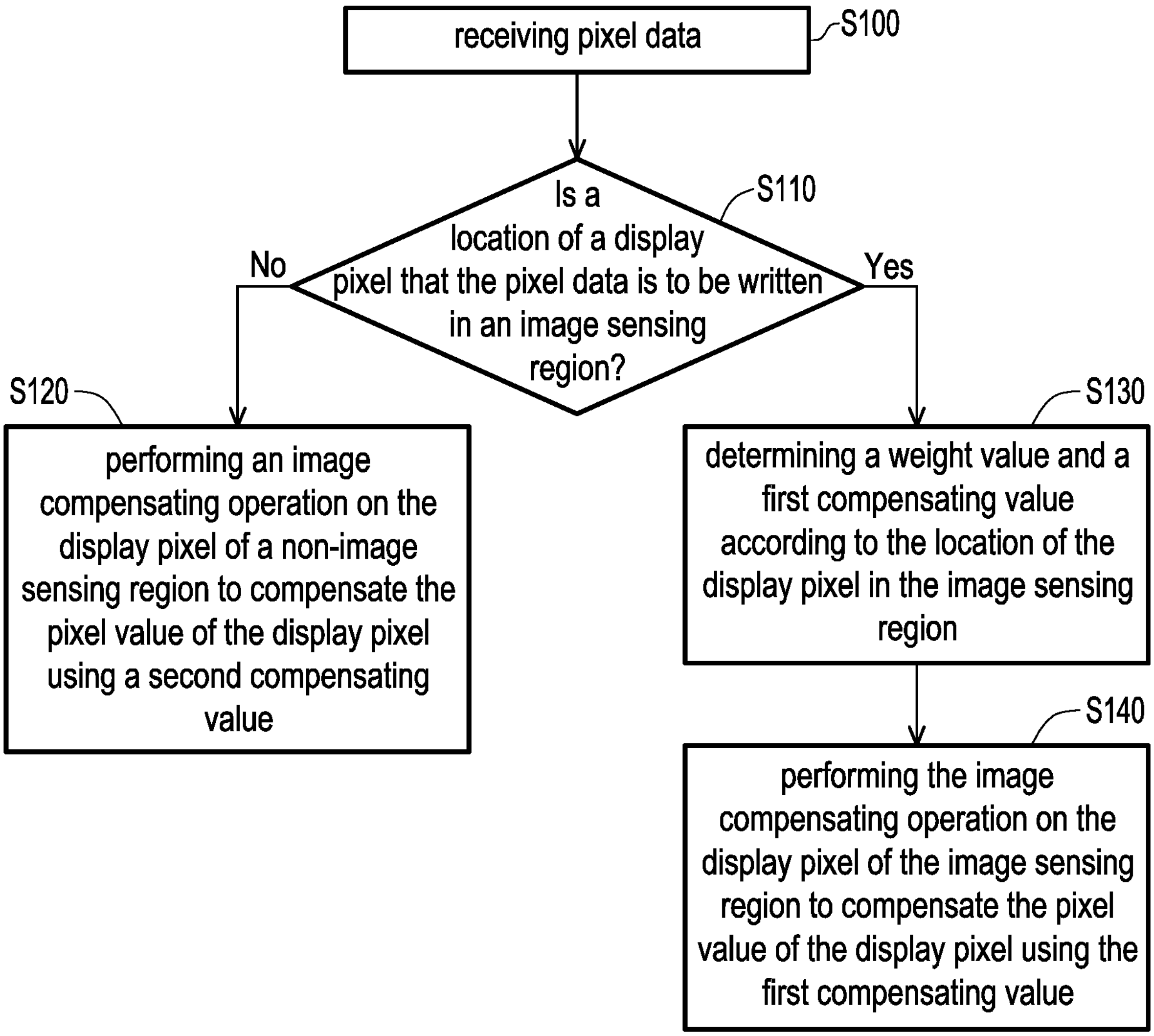
FIG. 4 is a flowchart illustrating a method for compensating pixel values of display pixels according to an embodiment of the invention.

FIG. 4 is a flowchart illustrating a method for compensating pixel values of display pixels according to an embodiment of the invention. Referring to FIG. 1 to FIG. 3, the method for compensating the pixel values of the display pixels is at least adapted to the electronic device 100 depicted in FIG. 1 and FIG. 2, but the invention is not limited thereto.

Taking the electronic device 100 for example, in step S100, the controller circuit 112 receives the pixel data PD. In step S110, the controller circuit 112 determines a location of a display pixel that the pixel data PD is to be written.

When the controller circuit 112 determines that the location of the display pixel is in the non-image sensing region 124, the flow will go to step S120. In step S120, the controller circuit 112 performs the image compensating operation on the display pixel of the non-image sensing region 124 to compensate the pixel value of the display pixel using the second compensating value CV2.

When the controller circuit 112 determines that the location of the display pixel is in the image sensing region 122, the flow will go to step S130. In step S130, the controller circuit 112 determines the weight value Wd and the first compensating value CV1 according to the location of the display pixel in the image sensing region 122. For example, the weight value Wd can be determined according to the lookup table 300, and the first compensating value CV1 can be determined according to formula (1). In step S140, the controller circuit 112 performs the image compensating operation on the display pixel of the image sensing region 122 to compensate the pixel value of the display pixel using the first compensating value CV1.

The method for compensating pixel values of display pixels described in the embodiment of the invention is sufficiently taught, suggested, and embodied in the embodiments illustrated in FIG. 1 to FIG. 3, and therefore no further description is provided herein.

Figure 5:
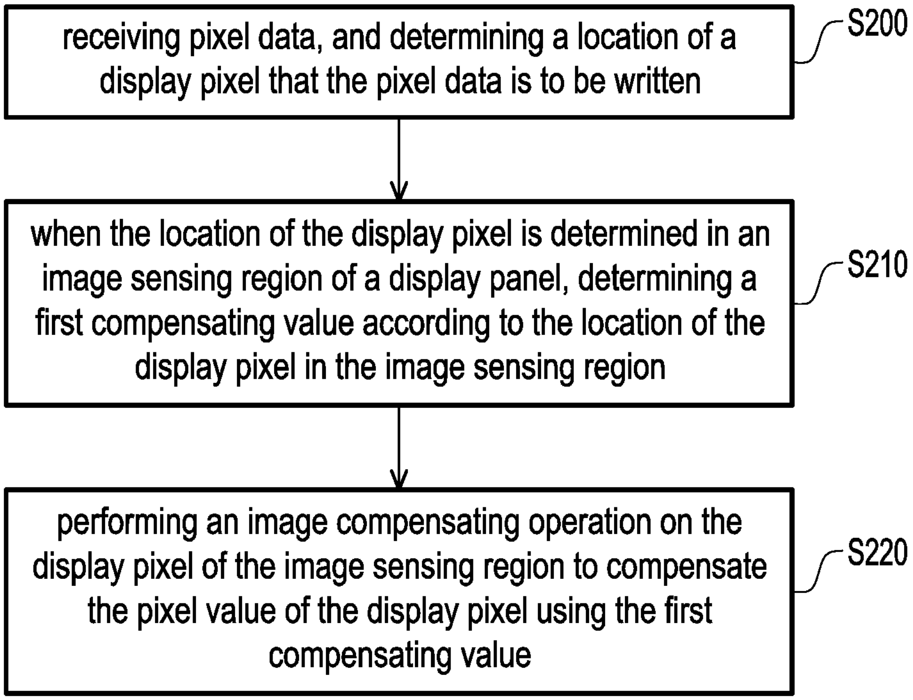
FIG. 5 is a flowchart illustrating a method for compensating pixel values of display pixels according to another embodiment of the invention.

FIG. 5 is a flowchart illustrating a method for compensating pixel values of display pixels according to another embodiment of the invention. Referring to FIG. 1 to FIG. 4, the method for compensating the pixel values of the display pixels is at least adapted to the electronic device 100 depicted in FIG. 1 and FIG. 2, but the invention is not limited thereto.

Taking the electronic device 100 for example, in step S200, the controller circuit 112 receives the pixel data PD, and determines a location of a display pixel that the pixel data PD is to be written. In step S210, when the location of the display pixel is determined in the image sensing region 122 of the display panel 120, the controller circuit 112 determines the first compensating value CV1 according to the location of the display pixel in the image sensing region 122. In step S220, the controller circuit 112 performs the image compensating operation on the display pixel of the image sensing region 122 to compensate the pixel value of the display pixel using the first compensating value CV1.

The method for compensating pixel values of display pixels described in the embodiment of the invention is sufficiently taught, suggested, and embodied in the embodiments illustrated in FIG. 1 to FIG. 4, and therefore no further description is provided herein.

In the disclosure, a plurality of lookup tables may set up for the image sensing region 122 in advance, and the lookup tables record relationships between the weight values Wd and the locations of the display pixels. It will be described as follows.

Figure 6:
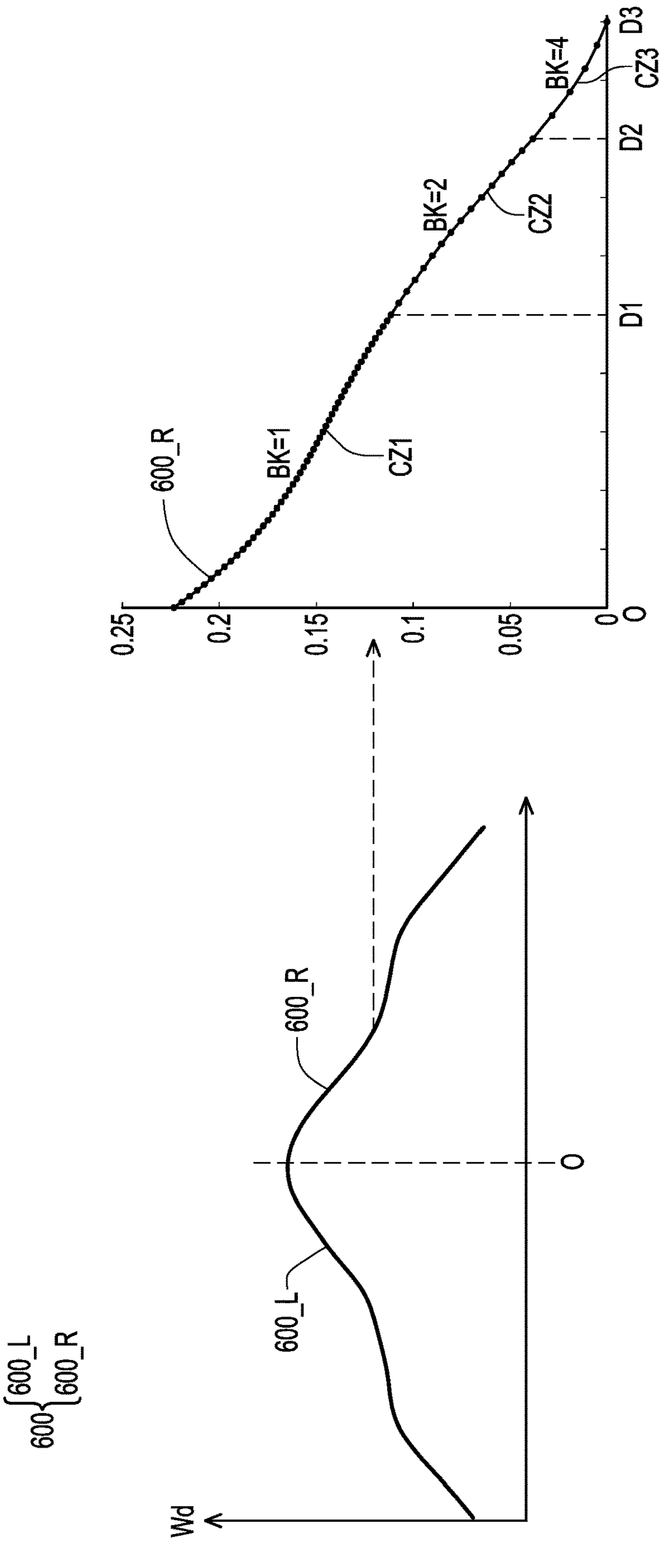
FIG. 6 illustrates lookup tables of a specified pixel value according to another embodiment of the invention.

FIG. 6 illustrates lookup tables of a specified pixel value according to another embodiment of the invention. FIG. 7 illustrates lookup tables of different pixel values according to an embodiment of the invention.

In FIG. 6, the lookup tables 600 of a gray level G8 (the specified pixel value) are illustrated for example. The lookup tables 600 include 600_L and 600R. The lookup tables 600_R are set up for the gray level G8 by capturing a gray level variation or a brightness variation of the image sensing region 122. The lookup tables 600_L can be mirrored from the lookup tables 600_R. The setup of the lookup tables 600_R is provided as an illustrative example for description purposes.

To be specific, the pixel data PD of the gray level G8 are inputted to drive the image sensing region 122 to display images. The gray level variation or the brightness variation of the image sensing region 122 is captured by an external image capturing device and converted into digital signals. The digital signals are further normalized to obtain weight values of different positions. Curve fitting is performed according to the weight values to obtain the curve 600_R, and the curve 600_R is divided into zones CZ1, CZ2 and CZ3. Block sizes BKs are set for different zones CZ1, CZ2 and CZ3. The block size BK indicates how many display pixels share the same weight value.

For example, the block size BK=1 is set for the zone CZ1. It indicates each display pixel of the first region 221 has its own weight value and recorded in the lookup table G8_1 of FIG. 7. The block size BK=2 is set for the zone CZ2. It indicates each two neighboring display pixels of the second region 222 share the same weight value and recorded in the lookup table G8_2 of FIG. 7. The block size BK=4 is set for the zone CZ3. It indicates each four neighboring display pixels of the third region 223 share the same weight value and recorded in the lookup table G8_3 of FIG. 7. That is to say, different regions 221, 222 and 223 of the image sensing region 122 have different block sizes. For the specified pixel value G8, the different lookup tables G8_1, G8_2 and G8_3 are set up for the different regions 221, 222 and 223 of the image sensing region 122.

Therefore, for the gray level G8, the lookup tables 600_R including G8_1, G8_2 and G8_3 can be obtained. In the lookup tables G8_1, G8_2 and G8_3, n is the $n^{th}$ display pixels from the inside out, dn*bk, dn*bk−D1, and dn*bk−D2 are display pixel positions, and Wd is the weight value. The lookup tables of other gray levels can be obtained in a similar manner. For example, in FIG. 7, for the gray level G16, the lookup tables including G16_1, G16_2 and G16_3 can be obtained, and for the gray level G32, the lookup tables including G32_1, G32_2 and G32_3 can be obtained.

In addition, for a specified region of the image sensing region 122, the different lookup tables are set up for different pixel values of the display pixels. For example, in FIG. 7, for the first region 221, i.e. the zone CZ1, the different lookup tables G8_1, G16_1 and G32_1 are set up for different gray levels G8, G16 and G32 of the display pixels. Similarly, for the second region 222, i.e. the zone CZ2, the different lookup tables G8_2, G16_2 and G32_2 are set up for the different gray levels G8, G16 and G32 of the display pixels. For the third region 223, i.e. the zone CZ3, the different lookup tables G8_3, G16_3 and G32_3 are set up for the different gray levels G8, G16 and G32 of the display pixels.

Therefore, the controller circuit 112 can determine the weight value Wd according to the lookup tables, as illustrated in FIG. 7, but the invention is not limited thereto. In an embodiment, the driver circuit 110 may further includes a storage circuit, coupled to the controller circuit 112, and configured to store the lookup tables. Since various block sizes are set up for different regions 221, 222 and 223 of the image sensing region 122, not all of the weight values of the display pixels are recorded in the lookup table, and thus no additional demura storage space is needed, which reduces the costs of manufacturing the product.

In summary, in the embodiments of the invention, the captured mura optical data is analyzed to obtained the weight values for the three regions of the image sensing region. When displaying images, the controller circuit looks up the weight values based on the input data and the lookup tables, while taking into account the display pixel position to look up different lookup tables. The controller circuit obtains the weight values of different positions, and calculates the first compensating value, thereby compensating the pixel values of the display pixels to perform the image compensating operation. Therefore, uneven brightness of the image sensing region can be improved, and the brightness of the display panel becomes more uniform.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A driver circuit, comprising:

a controller circuit configured to perform an image compensating operation on a display pixel of an image sensing region of a display panel to compensate a pixel value of the display pixel using a first compensating value, wherein the image sensing region is a circular area comprising image sensors, and the controller circuit determines the first compensating value according to a location of the display pixel in the image sensing region, wherein the controller circuit determines a weight value according to the location of the display pixel in the image sensing region, and the first compensating value is obtained by modifying a second compensating value according to the weight value, and wherein a plurality of lookup tables are set up for the image sensing region, and the lookup tables record relationships between weight values and the locations of the display pixels.

2. The driver circuit of claim 1, wherein the controller circuit is further configured to perform the image compensating operation on a display pixel of a non-image sensing region of the display panel to compensate the pixel value of the display pixel using the second compensating value.

3. The driver circuit of claim 1, wherein the controller circuit determines the weight value according to the lookup tables.

4. The driver circuit of claim 1, wherein for a specified pixel value, the different lookup tables are set up for different regions of the image sensing region.

5. The driver circuit of claim 1, wherein for a specified region of the image sensing region, the different lookup tables are set up for different pixel values of the display pixels.

6. The driver circuit of claim 1, wherein different regions of the image sensing region have different block sizes, and the block size indicates how many display pixels share the same weight value.

7. The driver circuit of claim 1, wherein the lookup tables are set up for a specified pixel value by capturing a gray level variation and a brightness variation of the image sensing region.

8. The driver circuit of claim 1, further comprising: a storage circuit, coupled to the controller circuit, and configured to store the lookup tables.

9. The driver circuit of claim 1, wherein the image sensing region comprises a first region, a second region and a third region, and the first region is a circular area, the second region is a ring area surrounding the first region, and the third region is a ring area surrounding the second region.

10. The driver circuit of claim 9, wherein the first region comprises the image sensors and the display pixels, the second region comprises driving circuits and the display pixels, and the third region comprises the display pixels.

11. A method for compensating pixel values of display pixels, comprising: receiving pixel data, and determining a location of a display pixel that the pixel data is to be written; when the location of the display pixel is determined in an image sensing region of a display panel, determining a first compensating value according to the location of the display pixel in the image sensing region, wherein the image sensing region is a circular area comprising image sensors; and performing an image compensating operation on the display pixel of the image sensing region to compensate the pixel value of the display pixel using the first compensating value, wherein a step of determining the first compensating value according to the location of the display pixel in the image sensing region comprises: determining a weight value according to the location of the display pixel in the image sensing region; and modifying a second compensating value according to the weight value to obtain the first compensating value; and setting up a plurality of lookup tables for the image sensing region by capturing a gray level variation and a brightness variation of the image sensing region, wherein the lookup tables record relationships between the weight values and the locations of the display pixels.

12. The method for compensating the pixel values of the display pixels of claim 11, further comprising: when the location of the display pixel is determined in a non-image sensing region of the display panel, performing the image compensating operation on the display pixel of the non-image sensing region to compensate the pixel value of the display pixel using the second compensating value.

13. The method for compensating the pixel values of the display pixels of claim 11, wherein the step of determining the first compensating value according to the location of the display pixel in the image sensing region further comprises: determining the weight value according to the lookup tables.

14. The method for compensating the pixel values of the display pixels of claim 11, wherein a step of setting up the plurality of lookup tables for the image sensing region comprises: for a specified pixel value, setting up the different lookup tables for different regions of the image sensing region.

15. The method for compensating the pixel values of the display pixels of claim 11, wherein a step of setting up the plurality of lookup tables for the image sensing region comprises: for a specified region of the image sensing region, setting up the different lookup tables for different pixel values of the display pixels.

16. The method for compensating the pixel values of the display pixels of claim 11, wherein different regions of the image sensing region have different block sizes, and the block size indicates how many display pixels share the same weight value.

* * * * *